(12) United States Patent
Sinnige

(10) Patent No.: US 6,890,976 B2
(45) Date of Patent: May 10, 2005

(54) WAX EMULSION FORMULATION AND GYPSUM COMPOSITION CONTAINING SAME

(75) Inventor: Laurence Anthony Sinnige, Niagara-on-the-Lake (CA)

(73) Assignee: Walker Industries Holdings Limited, Ontario (CA)

(*) Notice: Subject to any disclaimer, the term of this patent is extended or adjusted under 35 U.S.C. 154(b) by 0 days.

(21) Appl. No.: 10/725,428

(22) PCT Filed: Jun. 3, 2002

(86) PCT No.: PCT/CA02/00812

§ 371 (c)(1),
(2), (4) Date: Jun. 4, 2001

(87) PCT Pub. No.: WO02/098816

PCT Pub. Date: Dec. 12, 2002

(65) Prior Publication Data

US 2004/0157962 A1 Aug. 12, 2004

Related U.S. Application Data

(63) Continuation of application No. PCT/CA02/00812, filed on Jun. 3, 2002.
(60) Provisional application No. 60/295,011, filed on Jun. 4, 2001.

(51) Int. Cl.[7] .............................. C08K 3/00; C08K 3/10
(52) U.S. Cl. ...................... 524/5; 524/275; 524/276; 524/277; 524/475; 524/487; 524/503
(58) Field of Search ................ 524/276, 277, 524/475, 487, 5, 275, 503

(56) References Cited

U.S. PATENT DOCUMENTS

| | | | |
|---|---|---|---|
| 3,428,591 A | * | 2/1969 | Lewis .................. 524/478 |
| 3,645,939 A | * | 2/1972 | Gaylord ................. 525/54.23 |
| 3,649,319 A | | 3/1972 | Smith |
| 3,935,021 A | | 1/1976 | Greve et al. |
| 4,042,409 A | | 8/1977 | Terada et al. |
| 4,094,694 A | | 6/1978 | Long |
| 4,140,536 A | | 2/1979 | Maier |
| 4,421,704 A | | 12/1983 | Reily |
| 4,518,652 A | | 5/1985 | Willoughby |
| 4,748,196 A | | 5/1988 | Kuroda et al. |
| 5,098,943 A | | 3/1992 | Tagawa et al. |
| 5,120,355 A | | 6/1992 | Imai |
| 5,437,722 A | | 8/1995 | Borenstein |
| 5,674,930 A | * | 10/1997 | Sugiura et al. ............ 524/404 |
| 5,763,497 A | | 6/1998 | Ikeda et al. |
| 5,968,237 A | | 10/1999 | Sinnige |

FOREIGN PATENT DOCUMENTS

| | | |
|---|---|---|
| CA | 2116483 | 7/1997 |
| CA | 2226246 | 7/2002 |
| EP | 0384322 B1 | 4/1994 |
| EP | 0669377 B1 | 1/1999 |
| GB | 2205562 | 9/1991 |

\* cited by examiner

*Primary Examiner*—Judy M. Reddick
(74) *Attorney, Agent, or Firm*—Finnegan, Henderson, Farabow, Garrett & Dunner, LLP

(57) ABSTRACT

An aqueous emulsion for imparting water repellency characteristics to gypsum products comprising: a) a hydrocarbon wax: b) a polyolefin-maleic anhydride graft polymer; and c) a polyvinyl alcohol composition comprising partially and/or fully hydrolyzed polyvinyl acetate. The emulsion may also contain other known ancillary components such as emulsifiers and stabilizers.

14 Claims, No Drawings

WAX EMULSION FORMULATION AND GYPSUM COMPOSITION CONTAINING SAME

CROSS REFERENCE TO RELATED APPLICATIONS

This application is a continuation of international application number PCT/CA02/00812, filed Jun. 3, 2002, the content of which is incorporated herein by reference, and claims the benefit of U.S. Provisional Application No. 60/295,011, filed Jun. 4, 2001, the content of which is incorporated herein by reference.

BACKGROUND OF THE INVENTION

1. Field of the Invention

This invention relates to a wax emulsion formulation, and more specifically, to a formulation for imparting water repellency characteristics to products made from gypsum slurries, such as gypsum wallboards or panels.

2. Description of the Prior Art

The production of gypsum based materials normally requires a slurry of calcium sulfate hemihydrate with water. The mixture is allowed to hydrate, or set to the harder calcium sulfate dihydrate, and the excess water is removed by drying through conventional methods. Gypsum products such as wall board panels are produced from a hardened gypsum core sandwiched between paper liners, with the liners forming the outer surfaces of the board. To overcome problems of water absorption by the hygroscopic gypsum, which may lead to weakening of the wall board, it is known to add hydrophobic components into the gypsum slurry prior to making the wallboards. Such hydrophobic components, such as asphalt, waxes etc, must be provided in the form of an emulsion so as to be miscible in the aqueous gypsum slurry. These emulsions provide the gypsum wallboards with water repellent characteristics. Examples of water repellent emulsions for gypsum slurries are provided in U.S. Pat. Nos. 5,437,722; 5,098,943; and 4,748,196.

Some of the problems associated with the known wax emulsions for gypsum slurries are as follows:

1. Wax-asphalt emulsions are generally unstable. That is, the emulsion tends to separate over time into a liquid phase and a solid crust floating on top. The crust is not easily re-emulsified with mixing and can form lumps in the mix. When the board is produced, the un-emulsified asphalt component bleeds out of the set gypsum core and shows up as black spots on the paper liners.

2. Wax-asphalt emulsions are dark because of the asphalt component, which makes the gypsum core in the final board product off-colour.

3. Asphalt is generally derived from crude petroleum refining processes, which can vary in properties and, therefore, increase the variability in emulsion usage, end-product quality and wallboard manufacturing.

4. Other wax substitutes, such as montan wax or lignite, while providing good water repellency, are known to cause a build-up of dark or black sludge in process tanks used for emulsification.

5. Many wax emulsions based on montan wax or other natural or synthetic ester waxes, while they are more readily re-mixed than asphalt wax emulsions, still tend to separate during storage. This separation or "creaming" effect results in inconsistent performance characteristics.

6. Wax emulsions based on montan wax exhibit deficiencies related to the crude nature of the montan wax, which contains a variety of components. The composition of montan wax is also known to vary from one geographic region to another. The variability of the components results in discoloration of the resulting emulsion and variable emulsion quality.

Applicant's prior U.S. Pat. No. 5,968,237, teaches an aqueous wax emulsion specifically comprising hydrocarbon wax, an alkyl acid and/or alkyl ester, and a polyvinyl alcohol, for addition to a gypsum slurry. The slurry may be used in the production of wall boards and panels. The emulsion composition is intended to provide water repellency to the wall board formed without adversely affecting the stability of the gypsum slurry.

The water repellent emulsion composition proposed in U.S. Pat. No. 4,748,196 comprises a wax and an olefin-maleic anhydride copolymer in the presence of a water-soluble alkaline compound. The olefin is selected from a group consisting of an adduct or copolymer of an $\alpha$-olefin and the wax component includes paraffin wax, montan wax, and a low melting point polyolefin wax. The composition is intended to provide good water repellency without affecting the stability of the emulsion however, the use of montan wax results in some discoloration and variability of the emulsion. In addition, an $\alpha$-olefin is generally a single medium-length, even-numbered, unbranched aliphatic chain having a carbon to carbon double bond located at the $\alpha$ end only for the binding site of the anhydride.

The present invention seeks to provide an improved wax emulsion which overcomes some of the deficiencies of the prior art emulsions.

SUMMARY OF THE INVENTION

In one aspect, the present invention provides an aqueous emulsion, for addition to an aqueous gypsum slurry, comprising:

a hydrocarbon wax;

a polyolefin-maleic anhydride graft polymer;

polyvinyl alcohol.

In another aspect, the invention provides a gypsum slurry composition, for use in making gypsum products, comprising a mixture of:

a) an aqueous gypsum slurry; and, b) an emulsion comprising:
   a hydrocarbon wax;
   a polyolefin-maleic anhydride graft polymer;
   polyvinyl alcohol.

DESCRIPTION OF THE PREFERRED EMBODIMENTS

The present invention provides a wax emulsion for imparting water repellency characteristics to gypsum products comprising various components. The emulsion according to the present invention has been found to provide various advantages over known formulations. Firstly, the present invention allows for the substitution of the combined wax-asphalt component with a compound which does not produce an off-colour gypsum wallboard and one that has improved stability over asphalt-based emulsions. Further, it allows use of substitutes for asphalt with improved consistency of properties and performance. The present invention also allows use of substitutes for known naturally occuring waxes, such as montan wax, with improved consistency of properties and performance. Finally, the present invention provides an emulsion that results in improved water repellency over prior art based emulsions.

In a preferred embodiment, the invention comprises a composition having the following components:

a) hydrocarbon wax;
b) a polyolefin-maleic anhydride graft polymer; and
c) polyvinyl alcohol.

The first component (a) is a hydrocarbon wax. The hydrocarbon wax component may comprise any wax known in the field of gypsum slurry emulsions. Generally, the wax component of the invention comprises a petroleum fraction wax, either microcrystalline or paraffin. In the preferred embodiment the hydrocarbon wax component (a) is paraffin wax. However waxes such as carnauba wax, polyethylene wax, maleated hydrocarbon waxes, and combinations thereof may be used as well. The hydrocarbon wax used may also be a synthetic wax ester or an acid wax.

The polyolefin-maleic anhydride graft polymer component (b) comprises at least one maleic anhydride moiety grafted onto a polyolefin backbone. The graft polymer acts as an emulsifier. The polyolefin backbone has a carbon chain length generally in the range of 50–500 carbon atoms. These carbon chains may be both linear and/or branched, and further may be saturated or unsaturated. In the preferred embodiment, the polyolefin backbone is a homopolymer.

Polyolefins by definition, consist of a chain of hydrocarbons derived from a particular group of base chemicals known as olefins. Olefins, also known as alkenes, contain of one or more pairs of carbon atoms linked by a double bond. Polyolefins may be produced by addition polymerization where the carbon to carbon double bond of an olefin is broken to produce a pair of reactive sites. These reactive sites link to the carbon atoms of another olefin so as to form long carbon chains resulting in the creation of a polyolefin.

In the preferred embodiment, the polyolefin-maleic anhydride graft polymer has a saturated polyethylene backbone. The polyolefin-maleic anhydride graft polymer is produced by grafting at least one maleic anhydride moiety onto the polyethylene backbone such that the maleic anhydride attaches to the polyolefin at any one of the carbon atoms along the length of the polymer. The polyolefin maleic anhydride graft polymer may be further reacted with other compounds such as amines and esters to form derivatives of the polyolefin-maleic anhydride graft polymer. These resultant graft polymer derivatives include polyimides, polyamines, polyacids, polysalts, polyesters and combinations thereof.

As illustrated below, the use of a polyolefin-maleic anhydride graft polymer in the emulsion formulation provides improved water repellency in the final gypsum product when compared to emulsions containing α-olefin copolymers.

It is contemplated that a wide variety of polyolefin maleic anhydride graft polymers may be utilized in the present composition. Examples of suitable polyolefin-maleic anhydride graft polymers include the Ceramer® 5005 and Ceramer® 67 grafted polymers produced by Baker Petrolite, although others are available. The polyolefin backbone in the Ceramer® 67 polymer is a saturated polyethylene and the molecular weight of the polymer is 655.

The third component (c) of the emulsion formulation is polyvinyl alcohol. As is commonly known in the field, the polyvinyl alcohol that is used in formulations of the invention can comprise any grade of partially and/or fully hydrolyzed polyvinyl acetate. In the preferred embodiment, the polyvinyl alcohol comprises at least 80% hydrolyzed polyvinyl acetate at the time of addition to the emulsion. Hydrolysis of the acetate may continue after mixing the polyvinyl alcohol into the composition. The polyvinyl alcohol provides emulsion stability as well as increased stability in the gypsum slurry while providing superior water repellency in the final gypsum product.

To further improve the overall properties of this invention there may be added secondary emulsifiers and/or stabilizers to the components (a) and (c). These components are commonly known in the art. These compounds are commonly known in the relevant prior art.

The amount the above described emulsion formula used in a gypsum slurry will depend upon various factors that influence water absorption. For example, gypsum, being a crude product, will have varying water absorption levels. Further, varying environmental conditions (i.e. humidity levels) will also affect water absorption characteristics. For this reason, the amount of the emulsion of the invention to be added can be determined by persons skilled in the art using known methods. For example, one known method of determining the amount of emulsion to add involves the formation of 12"×12"×½" panels of the gypsum slurry and heating them to dry. The panels are then cooled to ambient temperatures and then immersed in water for 2 hours. After the hydration step, the amount of water absorbed is measured. The industry test is to achieve less than 5% water absorption by weight of the initial weight of the dry panel.

The following examples are intended to illustrate the properties of the present invention and should not be interpreted as limiting the invention in any way.

EXAMPLES

Comparative Data: Graft Polymer vs. Alpha Olefin Maleic Anhydride Copolymer

Inventive sample A: 8 parts of a maleic anhydride graft polymer (Ceramer® 67 manufactured by Baker Petrolite) was added to 100 parts of paraffin wax in a molten state. The blended wax was then dispersed in an alkaline solution of polyvinyl alcohol using a high-speed mixer. The resulting emulsion was quickly cooled to a temperature below 30 degrees Celsius.

Comparative sample B: As in A substituting 8 parts of a $C_{18}$ alpha olefin maleic anhydride copolymer (X-5231™ manufactured by Baker Petrolite) for 8 parts of graft polymer.

Comparative sample C: As in A substituting 8 parts of a $C_{28}$+ alpha olefin maleic anhydride copolymer (X-8039™ manufactured by Baker Petrolite) for 8 parts of graft polymer.

Comparative sample D: As in A substituting 8 parts of an ethylene maleic anhydride copolymer (A-C® 575 manufactured by Honeywell) for 8 parts of graft polymer.

The above-mentioned emulsions were individually mixed into a slurry of calcium sulphate hemi-hydrate at a ratio of 3 parts emulsion to 100 parts hemi-hydrate gypsum. The resulting mixture, was set in the form of pucks of ½" thickness and approximately 2½" to 3" diameter. The pucks were heated to dryness in a convection oven, cooled overnight to ambient temperature, and then immersed in water for 2 hours. The percentage of water absorbed by these samples is summarized in the following Table 1:

TABLE 1

| SAMPLE DATA | PERCENT OF INITIAL WEIGHT ABSORBED |
|---|---|
| A | 2.54% |
| B | 8.55% |
| C | 11.8% |
| D | 7.95% |

These results demonstrate a significant improvement in water repellency with using the graft polymer of the present invention when compared to the alpha olefin and ethylene maleic anhydride copolymers.

Although the invention has been described with reference to certain specific embodiments, various modifications thereof will be apparent to those skilled in the art without departing from the spirit and scope of the invention as outlined in the claims appended hereto.

What is claimed is:

1. An aqueous emulsion, for addition to an aqueous gypsum slurry, comprising:

a hydrocarbon wax;

a polyolefin-maleic anhydride graft polymer; and a polyvinyl alcohol.

2. The emulsion of claim 1 wherein said polyolefin-maleic anhydride graft polymer includes at least one maleic anhydride group grafted onto a polyolefin backbone.

3. The emulsion of claim 2 wherein said polyolefin backbone is polyethylene.

4. The emulsion of claim 1 wherein said hydrocarbon wax is a paraffin wax.

5. The emulsion of claim 1 wherein the polyvinyl alcohol is chosen from the group consisting of partially hydrolyzed polyvinyl acetate, fully hydrolyzed polyvinyl acetate and mixtures thereof.

6. The emulsion of claim 5 wherein the polyvinyl alcohol comprises at least 80 mol % hydrolyzed polyvinyl acetate.

7. The emulsion of claim 1 wherein the hydrocarbon wax is selected from the group consisting of paraffin wax, carnauba wax, polyethylene wax, maleated hydrocarbon waxes, hydrocarbon synthetic wax esters, hydrocarbon acid waxes, and combinations thereof.

8. A gypsum slurry composition, for use in making gypsum products, comprising a mixture of:

a) an aqueous gypsum slurry; and, b) an emulsion comprising:

a hydrocarbon wax;

a polyolefin-maleic anhydride graft polymer; and a polyvinyl alcohol.

9. The composition of claim 8 wherein said polyolefin-maleic anhydride graft polymer includes at least one maleic anhydride group grafted onto a polyolefin backbone.

10. The composition of claim 9 wherein said polyolefin backbone is polyethylene.

11. The composition of claim 8 wherein said hydrocarbon wax is a paraffin wax.

12. The composition of claim 8 wherein the polyvinyl alcohol is chosen from the group consisting of partially hydrolyzed polyvinyl acetate, fully hydrolyzed polyvinyl acetate and mixtures thereof.

13. The composition of claim 12 wherein the polyvinyl alcohol comprises at least 80 mol % hydrolyzed polyvinyl acetate.

14. The composition of claim 8 wherein the hydrocarbon wax is selected from the group consisting of paraffin wax, carnauba wax, polyethylene wax, maleated hydrocarbon waxes, hydrocarbon synthetic wax esters, hydrocarbon acid waxes, and combinations thereof.

\* \* \* \* \*